US007337152B1

(12) United States Patent
Gawler

(10) Patent No.: US 7,337,152 B1
(45) Date of Patent: Feb. 26, 2008

(54) ACCOUNTING FOR POSTAL CHARGES

(75) Inventor: David Anthony Gawler, Sittingbourne (GB)

(73) Assignee: Neopost Limited, Essex (GB)

( * ) Notice: Subject to any disclaimer, the term of this patent is extended or adjusted under 35 U.S.C. 154(b) by 0 days.

(21) Appl. No.: 09/502,212

(22) Filed: Feb. 11, 2000

(30) Foreign Application Priority Data

Feb. 13, 1999 (GB) ................................ 9903301.1

(51) Int. Cl.
*G06F 17/00* (2006.01)

(52) U.S. Cl. ...................................... 705/401; 705/404

(58) Field of Classification Search ................ 705/401, 705/404

See application file for complete search history.

(56) References Cited

U.S. PATENT DOCUMENTS

| | | | | |
|---|---|---|---|---|
| 4,584,647 A * | 4/1986 | Eckert | | 705/405 |
| 4,760,532 A | 7/1988 | Sansone et al. | | |
| 4,855,920 A * | 8/1989 | Sansone et al. | | 235/375 |
| 5,717,596 A | 2/1998 | Bernard et al. | | |
| 6,064,992 A * | 5/2000 | Herring | | 705/403 |
| 6,098,057 A * | 8/2000 | Dlugos | | 705/407 |

FOREIGN PATENT DOCUMENTS

| | | |
|---|---|---|
| EP | 0775985 A2 | 5/1997 |
| EP | 0 806 746 A2 * | 11/1997 |
| EP | 0 862 144 A2 * | 9/1998 |

OTHER PUBLICATIONS

Office Depot Web Site "www.officedepot.com"□□printed from "www.archive.org".*

Information on DirecTV, Inc., 1997-1998, printed through www.archive.org.*

United States Postal Service, "Information Based Indicia Program . . .", dated Jun. 13, 1996.

* cited by examiner

*Primary Examiner*—Naresh Vig
(74) *Attorney, Agent, or Firm*—Shoemaker and Mattare

(57) ABSTRACT

A method of accounting for postage charges in respect of batches of mail items is disclosed. The method includes storing an accumulated aggregate value of postage dispensed in applying postage charges to mail items and storing an accumulated pending value of postage dispensed in applying postage charges to mail items of a batch of mail items which has not been completed. In response to completion of the batch of mail items, the accumulated pending value is decremented by a value of postage relating to the completed batch of mail items.

13 Claims, 3 Drawing Sheets

ACCOUNTING FOR POSTAL CHARGES

BACKGROUND OF THE INVENTION

This invention relates to accounting for postal charges for batches of items of mail.

Postage meters for dispensing postage in respect of charges for mail items are known. In so-called pre-payment meters, a value of credit is stored in the postage meter and this value of credit is decremented by the amount of postage charge as each mail item is processed. Periodically, when the value of credit becomes low, payment for further postage is made and the credit value in the postage meter is reset. Other postage meters operate in a post payment mode in which the postage meter stores an accumulated aggregate value of postage dispensed in applying postage charges to mail items. Periodically the accumulated aggregate value of postage dispensed by the postage meter is determined by the postal authority and the user of the postage meter is billed for the value of postage dispensed.

When processing batches of mail which may contain relatively large numbers of mail items, it is convenient for accounting to be effected in respect of each batch of items and to make a payment in respect of each batch. Accordingly it has been proposed to create a statement of mailing in respect of the items in a batch. The statement of mailing contains data relating to the mail batch and this statement of mailing is used to effect a transfer of funds from the mailer's account to the account of the postal authority. Since the statement of mailing provides the basis for payment for postage charges it is necessary that the statement of mailing is created in a secure manner and that its authenticity can be verified. Accordingly the statement of mailing is digitally signed.

SUMMARY OF THE INVENTION

According to one aspect of the invention a method of accounting for postage charges in respect of batches of mail items includes the steps of:— storing an accumulated aggregate value of postage dispensed in applying postage charges to mail items;

storing an accumulated pending value of postage dispensed in applying postage charges to mail items of batches which have not been completed, and decrementing the accumulated pending value of postage dispensed in respect of a batch of mail items in response to the batch being completed.

The term "completed" in respect of batches of mail is to be understood as including batches of mail items for which postage charges have been applied in respect of all the mail items of the batch but not submitted to the postal authority, batches of mail items which have been submitted to a postal authority or batches of mail which have been submitted to and accepted by the postal authority.

The accumulated aggregate value of postage dispensed may be an accumulated value of postage dispensed in applying postage charges to completed batches of mail and in response to a batch of mail being completed the accumulated pending value is decremented by an amount equal to the postage charges in respect of a batch of mail when that batch is completed.

Alternatively the accumulated aggregate value of postage dispensed may be postage dispensed in applying postage charges to mail including both completed and uncompleted batches and the pending value is decremented by an amount equal to the cost of postage charges in respect of a batch of mail when that batch is completed.

The stored accumulated aggregate value of postage dispensed and the accumulated pending value of postage dispensed in applying postage charges to mail items of batches which have not been completed may be utilised to determine a payment due in respect of completed batches of mail.

According to a second aspect the invention also encompasses apparatus for carrying out the steps of the method hereinbefore defined.

BRIEF DESCRIPTION OF THE DRAWINGS

Embodiments of the invention will now be described by way of example with reference to the drawings in which:—

DESCRIPTION OF THE PREFERRED EMBODIMENT

Figure 1:
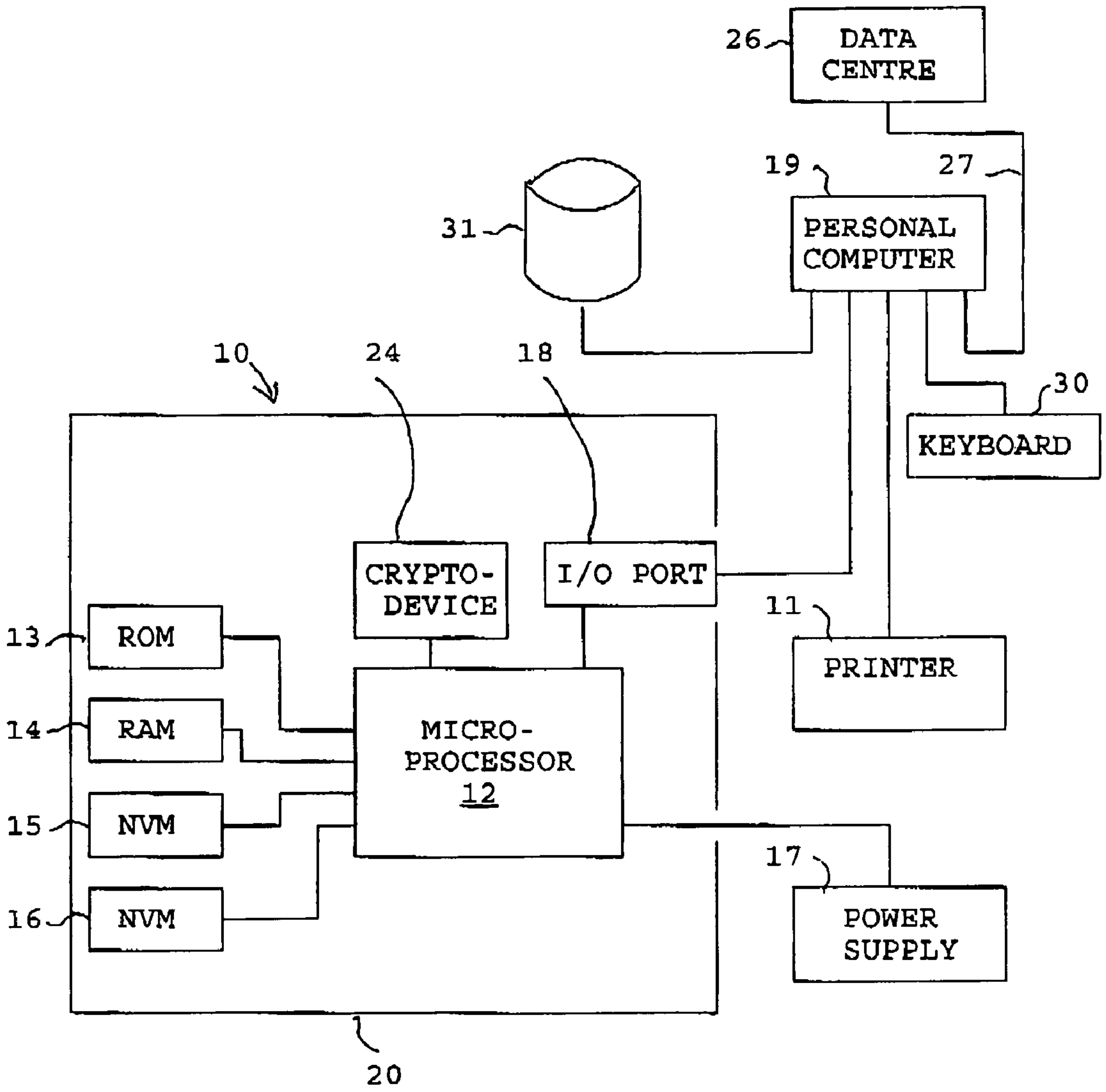
FIG. 1 is a block diagram of mail preparation apparatus.

Referring to FIG. 1 of the drawings, mail preparation apparatus includes a postage metering device comprising a postal secure device (PSD) 10 operable to dispense postage in respect of mail items and a printer 11 for printing postal indicia on the mail items. The PSD 10 includes electronic accounting and control means comprising a micro-processor 12 operating under program routines stored in a read only memory (ROM) 13. A random access memory (RAM) 14 is provided for use as a working store for storage of temporary data during operation of the PSD. Non-volatile duplicated memories (NVM's) 15, 16 are provided for the storage of critical data relating to use of the PSD. The PSD is powered from an external mains powered power supply 17. The NVM's 15, 16 retain data stored therein even when the PSD 10 is not powered by the power supply 17. The PSD is provided with an input/output port 18 connected to a mail preparation interface which conveniently is a personal computer 19. The microprocessor 12 outputs, via the port 18, print data signals to the personal computer 19 for operation of the printer 11 and receives from the personal computer 19, via the port 18, postal data relating to mail items to be printed with postage indicia. The postal data may be input by means of a user operated keyboard or the like of the personal computer or from, for example, a database of recipient addresses. Also the personal computer is utilised to communicate with a remote data centre 26 of a postal authority that is to receive items of mail whereby messages may be sent by the mail preparation apparatus to the postal authority and messages may be received by the mail preparation apparatus from the postal authority. The communication between the mail preparation apparatus and the data centre 26 is effected via a communication link 27 which may be provided by a public telephone network. The personal computer may also be utilised to output control signals to other operational modules (not shown) of the mail preparation apparatus.

Figure 2:
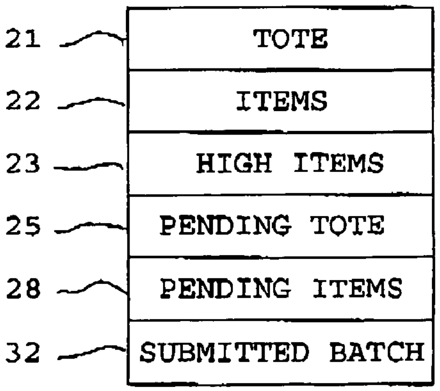
FIG. 2 illustrates registers provided in a postage metering device of the mail preparation apparatus.

The microprocessor 12 carries out accounting functions in relation to dispensing of postage charges by the postage meter in respect of mail items. Accounting data relating to operation of the PSD in dispensing postage charges is stored in the NVM's 15, 16. The accounting data includes an accumulated aggregate value of postage charges dispensed by the PSD 10, a count of the number of mail items processed and, if desired, a count of the number of mail items for which a postage charge in excess of a predetermined value has been dispensed. As illustrated in FIG. 2, the accumulated aggregate value of postage charges dispensed by the PSD is stored in an ascending tote register 21, the count of items is stored in an items register 22 and the count of items for which a postage charge in excess of a predetermined value has been dispensed is stored in a high items register 23. The NVM's 15, 16 also include a pending tote register 25 and, if desired, a pending items register 28. The functions of the pending tote register 25 and of the pending items register will be explained hereinafter.

As is well known in the postage metering art, each of the registers referred to hereinbefore for storing accounting data is replicated in order to enable integrity of the accounting data to be maintained even in the event of a fault or termination of power from the power supply 17 to the PSD. Two replications of each of the registers are provided in each of the memory devices 15, 16.

The PSD 10 also includes a crypto-device 24 operable by the microprocessor 12 to carry out cryptographic operations in respect of data. The cryptographic operations may include either or both encryption of data and the derivation of a digital signature from data.

In order to prevent or at least impede unauthorised access to the electronic circuits of the PSD, the PSD is housed in a secure housing 20 and the housing is so constructed or tamper detection means are provided to provide an indication if tampering has been attempted or has occurred.

In operation of the PSD 10 in respect of dispensing postage for a mail item, the microprocessor 12 carries out an accounting operation in respect of accounting data stored in the NVM's 15, 16 to reflect the postage charge to be applied to the mail item. This accounting operation includes incrementing of the tote register 21 by the amount of postage charge and incrementing of the items register 22 by unity for each mail item.

The microprocessor generates postal indicium data that is needed for inclusion in a postal indicium to be printed on the mail item. Data defining the postal indicium may be generated wholly by the PSD 10 or partly by the PSD and partly by the personal computer 19. The postal indicium data to be included in the postal indicium includes the amount of the postage charge, the date of processing the mail item and an identification of the PSD. In addition the postal indicium data may include additional data items for example a serial number for the item and recipient address data. The recipient address data in respect of a mail item may, for example, be recipient ZIP or postal code. The postal indicium also includes a digital signature and the microprocessor initiates operation of the crypto-device 24 to generate the digital signature. The crypto-device 24 operates under an algorithm using a stored cryptographic key to generate the digital signature derived from all or selected ones of the data items of the postal data. The cryptographic key is stored in the NVM's 15, 16. The microprocessor outputs the postal indicium data and the digital signature to the personal computer so that the personal computer is enabled to operate the printer to print the required postal indicium on the mail item, the printed postal indicium containing the data items of the postal indicium data and the digital signature. By including a digital signature in the indicium, the authenticity of the postal indicium data in the printed postal indicium may be verified by deriving a digital signature from the postal indicium data contained in the printed postal indicium and comparing the derived digital signature with the digital signature contained in the printed postal indicium. Instead of generating a digital signature, the crypto-device 24 may generate an encryption of the postal indicium data and the encryption of the postal indicium data is then included in the postal indicium. Authenticity of the printed postal indicium data may then be verified by decrypting the encryption and comparing the data obtained from decryption with the postal indicium data contained in the printed postal indicium.

In processing a batch comprising a plurality of mail items, the PSD carries out the accounting operation and the generation of a digital signature or encryption and operation of the printer to print a postal indicium in respect of each mail item of the batch. The PSD outputs the postal indicium data and the digital signature to the personal computer 19 to enable the personal computer 19 to operate the printer 11 to print the required postal indicium on each mail item.

As the mail items of a batch of mail are processed and postal indicia are printed thereon, the mail preparation apparatus accumulates mailing data relating to the mail items of the batch of mail. The mailing data includes items of data that are input to the mail preparation apparatus or that are generated in connection with the processing of the mail. Examples of items of data that may be included in the mailing data are postage charge, class of service and recipient address data. The mailing data may relate to each individual item of a batch of mail or may relate to sets of mail items in the batch where a set of mail items is a group of mail items having a predetermined common characteristic, for example a set of mail items may comprise a group of mail items having the same class of service, a group of mail items having the same postage charge, a group of mail items having a common destination area. However it is to be understood that a set of mail items may be a group of mail items having any other predetermined common characteristic or combination of predetermined common characteristics by which the postal authority wish to handle the mail items of the batch. It will be appreciated that a set of mail items may comprise only a single mail item and that a batch of mail items may comprise one or more sets of mail items as well as one or more single mail items which do not have the predetermined characteristic in common with other mail items. Furthermore it is to be understood that a batch of mail items may include more than one set having the same predetermined common characteristic.

The mail preparation apparatus accumulates the mailing data and when the final item of a batch of mail items has been processed, the mail preparation apparatus generates a submission message containing the accumulated mailing data relating to the mail items in the batch of mail items. The submission message is sent to the postal authority. The submission message provides the postal authority with information, for example the quantity of mail, the class or classes of service and the destinations of the mail items, whereby the postal authority is enabled to determine the logistics of handling the mail items. The submission message may accompany the batch of mail items when the batch of mail is dispatched to the postal authority. However it is preferred that the submission message is transmitted electronically to the postal authority and accordingly for this purpose the personal computer 19 is placed in communication with the data centre 26 of the postal authority. The transmission of the submission message to the postal authority is effected, after all of the items of the batch of mail have been processed by the mail preparation apparatus, when it is decided to submit the batch of mail to the postal authority. As a result the postal authority receives the mailing data relating to the batch of mail prior to receiving the actual batch of mail and is enabled to plan, in advance of receipt of the mail, for the handling of the mail items of the batch. The submission message for a batch of mail will usually contain a large amount of data. Generation of a digital signature for the submission message to enable authentication of the data in the submission message therefore would involve processing of this large amount of data and a large amount of secure memory would be needed to for storing the data. Accordingly the submission message is not digitally signed or stored in secure memory. In addition to providing information to the postal authority in respect of the mail items to enable the postal authority to handle the mail items of the batch and to plan the logistical handling of the mail the submission message may contain data relating to postage charges for the items in the batch, but this data is not authenticated. Data relating to payment for postage charges is transmitted in a verifiable manner by means of an account statement as will be explained hereinafter.

Figure 3:
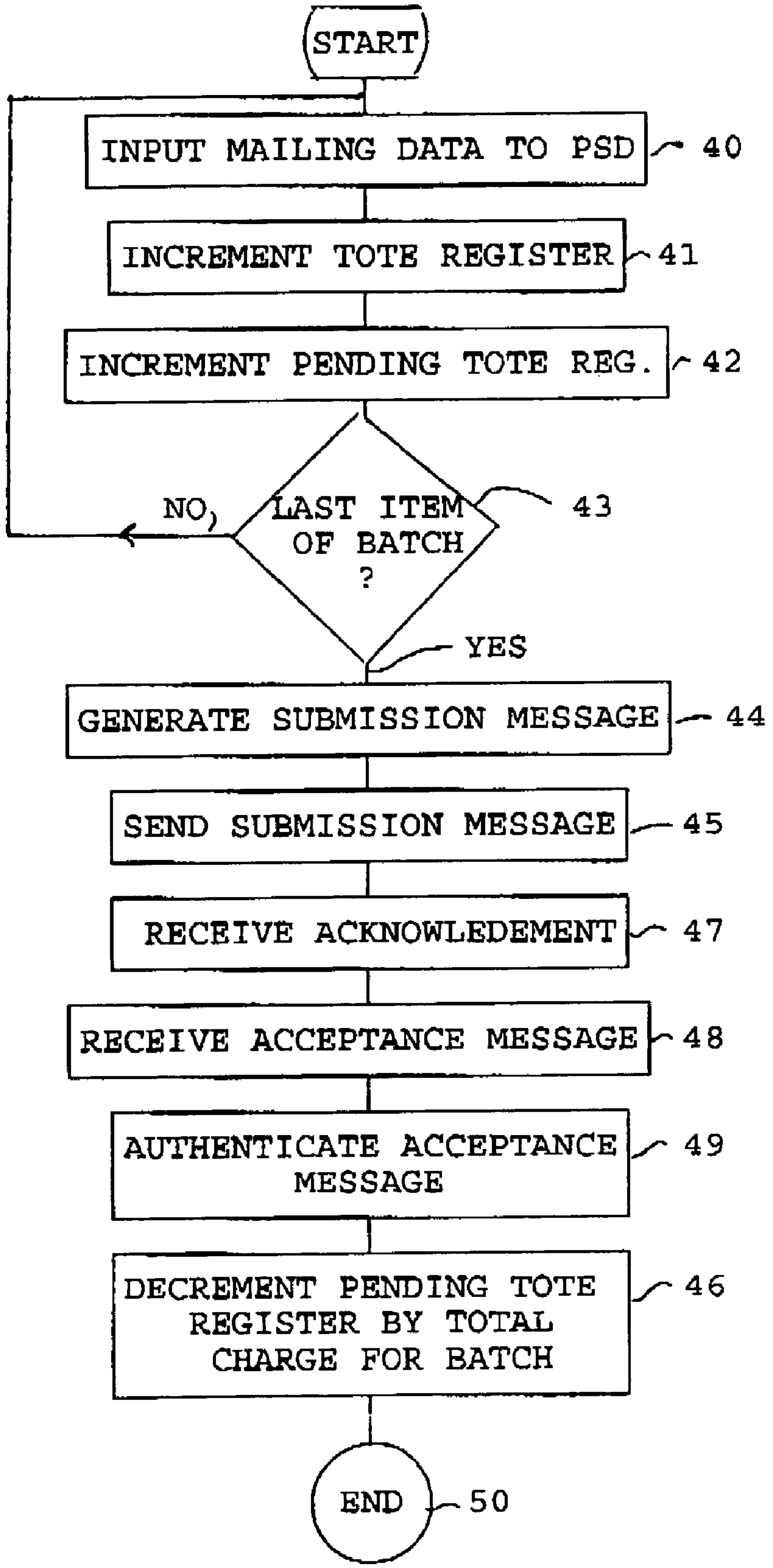
FIG. 3 is a flow chart illustrating a routine for processing batches of mail.

As mentioned in relation to FIG. 2, the NVM's 15, 16 are provided with a pending tote register 25 and, if desired, a pending items register. When mail items are processed, as illustrated by a routine illustrated by the flow chart of FIG. 3, mailing data is input (box 40) to the PSD and the tote value in the tote register 21 is incremented (box 41) as described hereinbefore. In addition, the pending tote register 25 also is incremented (box 42) by the amount of the postage charge. If the mail item is not the last item of a batch (NO output of decision box 43) the routine returns to box 40 for input of further mailing information. When all of the mail items of a batch of mail have been processed (YES output of decision box 43) and it is desired to submit the batch of mail to a postal authority, the mail preparation apparatus generates (box 44) a submission message and transmits (box 45) the submission message as hereinbefore described and submission of the physical mail items to the postal authority is initiated. Subsequent to transmission of the submission message the microprocessor decrements (box 46) the pending tote register 25 by the total postage charge for the batch of mail submitted to the postal authority.

If the pending tote register is zero at the commencement of processing a batch of mail, at the end of processing that batch the pending tote register value will have been incremented to equal to the total postage charge for the batch. If all the items of the batch have been processed but the batch has not yet been submitted to the postal authority and processing of a subsequent batch is commenced, the pending tote register value will be equal to the total postage charge for the processed batch plus the aggregate of postage charges for those items of the subsequent batch which have been processed. Accordingly when the batch is submitted to the postal authority, the pending tote register will be decremented by an amount equal to the total postage charge for the submitted batch and the resultant register value will be the aggregate postage charge of the items of the subsequent batch that is being processed. Thus at any time, the value of the pending tote register 25 is equal to the aggregate value of postage charges for items which have been processed but which have not yet been submitted to the postal authority.

The submission of a batch of mail to the postal authority involves passing a number of messages between the mail preparation apparatus of the mailer and the postal authority. These messages include the submission message sent (box 45) from the mailer to the postal authority, an acknowledgement message sent by the postal authority and received (box 47) by the mailer acknowledging receipt of the submission message by the postal authority, and an acceptance message sent by the postal authority when a batch of mail is accepted by the postal authority and received (box 48) by the mailer. The decrementing (box 46) of the pending tote register in respect of a submitted batch of mail is initiated by the transmission (box 45) of the submission message or the receipt of one of the messages (boxes 47, 48) from the postal authority. Preferably the decrementing of the pending tote register is initiated by receipt (box 48), by the mail preparation apparatus, of the acceptance message from the postal authority. The acceptance message may include an amount determined by the postal authority to be due in respect of the total postage charge for the batch of mail accepted by the postal authority and, in response to receipt of the message, the microprocessor 12 is operated to effect decrementing of the pending tote register by the amount of total postage charge contained in the acceptance message. Instead of including the determined postage charge in the acceptance message, the PSD may include an additional register 32 to store the total postage charge for a batch of mail submitted to the postal authority. It is preferred that the acceptance message is digitally signed and, when received by the mail preparation apparatus, that the authenticity of the acceptance message is verified (box 49) prior to effecting decrementing (box 46) of the pending tote register. After decrementing the pending tote register, the routine ends (box 50).

It will be appreciated that the tote register value is the accumulated aggregate value of postage which has been dispensed and hence is the sum of postage charges which have been dispensed in respect of items of batches which have been submitted to the postal authority, of postage charges in respect of items of any batch or batches for which all the items have been processed which has not yet been submitted and of postage charges in respect of those items which have been processed of any batch for which the processing has not yet been completed.

Periodically the PSD is operated to generate an account statement that is transmitted to the remote data centre 26, or to an accounting centre operated by or on behalf of the postal authority, for the purpose of accounting for payment of charges incurred by the PSD.

The account statement includes at least an identification of the PSD or of the mailer, the value of the tote register and the value of the pending tote register. The microprocessor operates the crypto-device 24 to derive a digital signature from data included in the account statement and the account statement is signed with this digital signature. The signed account statement is transmitted to the remote data centre. The remote data centre verifies the authenticity of the account statement by deriving a digital signature from the information received in the account statement and comparing the derived signature with the digital signature transmitted with the account statement. The verified account statement may then be used by the postal authority for billing the mailer or for initiating a transfer of funds from the mailer's bank account. Accordingly the account statement provides to the postal authority the aggregate of postage charges dispensed. The aggregate of postage charges dispensed at the time of the preceding account statement received by the postal authority is known to the postal authority and hence the postal authority is enabled to calculate the amount of postage dispensed since the preceding account statement. Also the account statement includes the pending tote register value of postage dispensed in respect of mail items not yet submitted and by subtraction of the pending tote register value the postal authority is provided with information as to the total payment due in respect of submitted complete mail batches. It will be appreciated that more than one batch of mail may have been completed and submitted after generation of the preceding account statement and hence a currently generated account statement will provide information as to the total payment due in respect of one or more completed batches of mail submitted after the generation of the preceding account statement.

In addition to the pending tote register 25, a pending items register 28 may be provided. The pending items register 28 is incremented by unity in respect of each mail item and when the pending tote register 25 is decremented in respect of postage charges for a submitted batch or batches of mail, the pending items register is decremented by the number of items in the batch or batches of mail submitted to and accepted by the postal authority.

Figure 4:
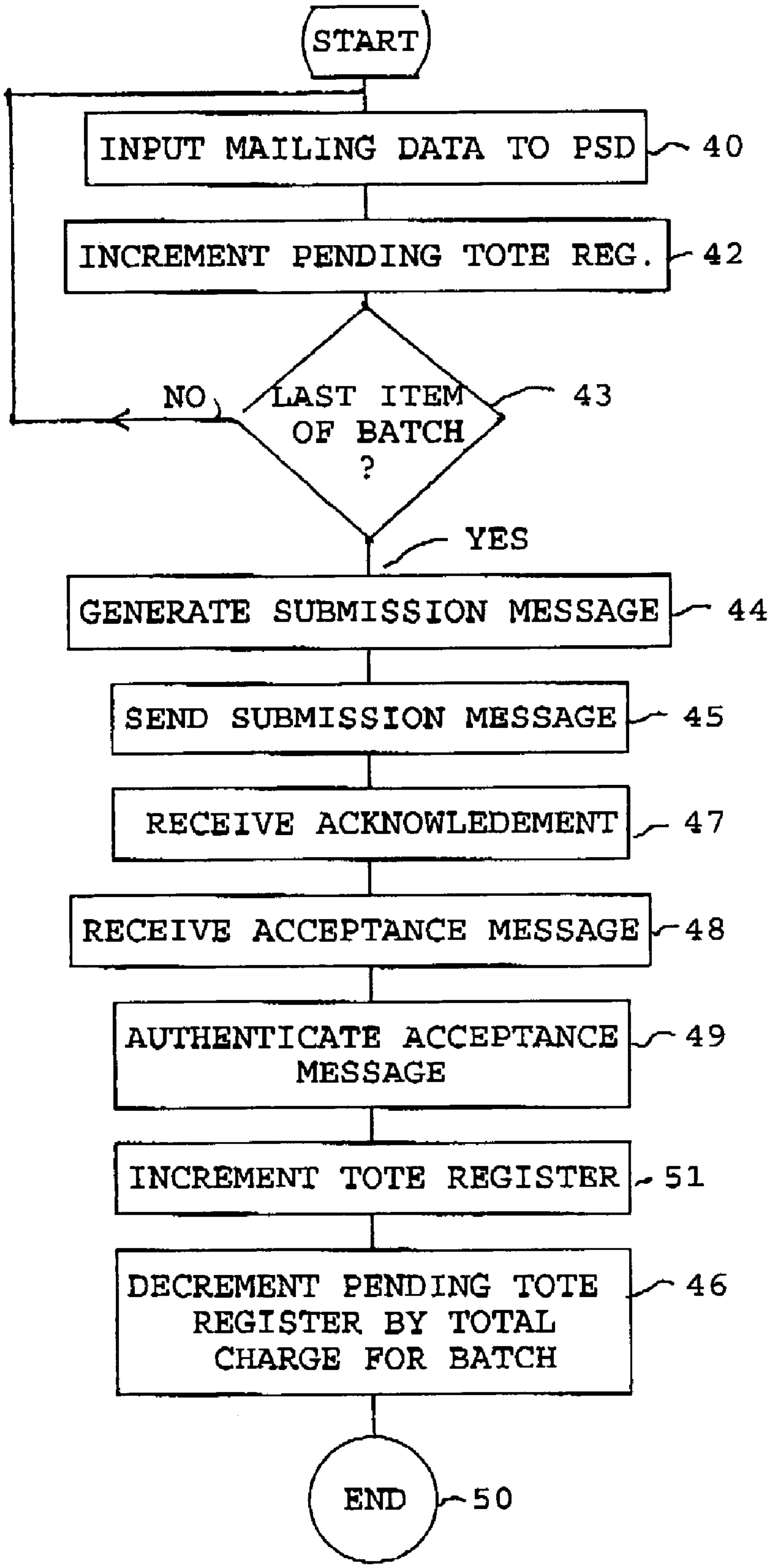
FIG. 4 is a flow chart illustrating a modification of the routine of FIG. 3.

In an alternative embodiment the storing of accounting data in the NVM's 15, 16 and the decrementing of the pending tote register 25, and if provided, the pending items register 28 is modified in a routine illustrated by the flow chart of FIG. 4. Steps of the routine corresponding to the steps of the routine of FIG. 3 have the same references. During processing of mail items the accounting data in the pending tote register 25 is incremented (box 42) by the amounts of postage charges applied in respect of the mail items but the tote register 21 is not incremented. Similarly if the pending items register 28 is provided, the pending items register is incremented but the items register 22 is not incremented. When a batch of mail is submitted and after acceptance of the batch (acceptance message received box 48) by the postal authority, the tote register 21 is incremented (51) by the total postage charge in respect of the accepted batch and the pending tote register 25 is decremented (46) by total postage charge in respect of that accepted batch. Thus at any instant, the value of the tote register 21 is equal to the total value of postage charges in respect of mail items that have been processed in batches that have been submitted to the postal authority and, as in the embodiment described hereinbefore, the value of the pending tote register 25 is equal to the aggregate value of postage charges for items which have been processed but which have not yet been submitted to the postal authority. If the pending items register 28 is provided, the value of the items register 22 is equal to the items count of mail items that have been processed in batches that have been submitted and accepted by the postal authority and the value of the pending items register 28 is equal to the count of items which have been processed but which have not yet been submitted to the postal authority.

It will be appreciated that, whereas the submission message and the data included therein is not critical for the accounting for payment in respect of postage charges as discussed hereinbefore, the account statement is critical for the accounting for payment in respect of postage charges and is generated securely within the secure housing of the PSD from accounting data stored securely in the NVM's 15, 16 and the digital signing of the account statement enables the verification of authenticity of the account statement by the postal authority. Since the mailing data is not critical accounting data, the mailing data may be accumulated in non-secure storage, for example a hard disc storage device of the personal computer and the submission message may be generated by the personal computer.

It is to be understood that the account statement may be generated and transmitted at any convenient time and that the provision of the pending tote register 25 enables determination of the amount of postage dispensed in respect of mail items of batches of mail which have not been submitted to the postal authority so that it is possible to distinguish between an amount of committed postage charges dispensed in respect of batches of mail which have been submitted to the postal authority and an amount of un-committed postage charges in respect of items of mail for which a batch has not been submitted to the postal authority.

I claim:

1. A method of accounting for postage charges in respect of batches of mail items, said method including steps of:

storing an accumulated aggregate value of postage dispensed in applying postage charges to mail items;

storing an accumulated pending value of postage dispensed in applying postage charges to mail items for the mail items of each respective uncompleted batch of mail items; and in response to completion of one batch of mail items, decrementing the accumulated pending value by a value of postage relating to the one completed batch of mail items.

2. A method as claimed in claim 1, wherein the step of storing the accumulated pending value includes the step of:

storing an accumulated pending value of postage dispensed in applying postage charges to mail items of the one uncompleted batch of mail items and postage charges to further mail items of at least one further uncompleted batch of mail items.

3. A method as claimed in claim 1, wherein the accumulated aggregate value comprises postage dispensed on mail items of the one completed batch of mail items and postage dispensed on mail items of at least one further uncompleted batch of mail items.

4. A method as claimed in claim 1, wherein the accumulated aggregate value consists only of the postage dispensed in respect of mail items of completed batches of mail items.

5. A method as claimed in claim 4, including the step of:

incrementing the accumulated aggregate value by the value of postage relating to the one batch of mail items in response to completion of the same.

6. A method as claimed in claim 1, wherein the value of postage relating to the one completed batch of mail items is the postage dispensed in respect of the one completed batch of mail items.

7. A method as claimed in claim 1, further including the steps of:

receiving a message from a mail handling authority in respect of the one completed batch of mail items; and decrementing the accumulated pending value by a value of postage relating to the one completed batch of mail items.

8. A method as claimed in claim 7, wherein the message includes an indication of an amount of postage charge determined by the mail handling authority to be due on the one completed batch of mail items, and the value of postage relating to the one completed batch of mail items is the amount of postage charge indicated in the message.

9. A method as claimed in claim 1, including the step of:

utilizing the accumulated aggregate value and the accumulated pending value to determine a payment due in respect of postage charges.

10. Apparatus for accounting for postage charges in respect of batches of mail items, including:

a first memory storing an accumulated aggregate value of postage dispensed in applying postage charges to mail items;

a second memory storing an accumulated pending value of postage dispensed in applying postage to mail items for the mail items of each respective uncompleted batch of mail items; and accounting means operable in response to completion of one batch of mail items to decrement the accumulated pending value by a value of postage relating to the one completed batch of mail items.

11. Apparatus as claimed in claim 10, wherein the first memory stores an accumulated aggregate value of postage dispensed in applying postage charges to mail items of completed batches of mail items and postage charges to mail items of the one uncompleted batch of mail items.

12. Apparatus as claimed in claim 10, wherein the first memory stores an accumulated aggregate value of postage dispensed in applying postage charges to mail items to completed batches of mail items.

13. Apparatus as claimed in claim 12, wherein the accounting means is operable in response to completion of the one batch of mail items to increment the first memory by the value of postage dispensed in respect of the one completed batch of mail items.

* * * * *